(12) United States Patent
Mitchell

(10) Patent No.: US 7,693,630 B1
(45) Date of Patent: Apr. 6, 2010

(54) SNOW MELTING SYSTEM

(76) Inventor: Dwayne R. Mitchell, 4206 Carpenter Ave., Bronx, NY (US) 10466

( * ) Notice: Subject to any disclaimer, the term of this patent is extended or adjusted under 35 U.S.C. 154(b) by 388 days.

(21) Appl. No.: 11/611,615

(22) Filed: Dec. 15, 2006

(51) Int. Cl.
*G06F 7/00* (2006.01)

(52) U.S. Cl. .............................. 701/36; 701/3; 219/202; 219/482

(58) Field of Classification Search ........................ None
See application file for complete search history.

(56) References Cited

U.S. PATENT DOCUMENTS

| 3,982,092 | A |   | 9/1976 | Marriott |            |
|-----------|---|---|--------|----------|------------|
| D263,393  | S |   | 3/1982 | Lindmayer |           |
| 5,187,350 | A |   | 2/1993 | Tsuchiya |            |
| 5,344,696 | A | * | 9/1994 | Hastings et al. | 428/220 |
| 5,998,770 | A | * | 12/1999 | Sundby | 219/528 |
| 6,028,291 | A |   | 2/2000 | Heisler |            |
| 6,140,609 | A | * | 10/2000 | Jones | 219/202 |
| D449,375  | S |   | 10/2001 | Andersson et al. |    |
| 6,808,450 | B2 |  | 10/2004 | Snow |              |
| 6,870,139 | B2 | * | 3/2005 | Petrenko | 219/482 |
| 7,502,353 | B2 | * | 3/2009 | Bolz | 370/338 |
| 2003/0141289 | A1 |  | 7/2003 | Fisher |          |

* cited by examiner

*Primary Examiner*—Richard M. Camby

(57) ABSTRACT

A snow melting system for heating a vehicle to melt snow and ice from an exterior of the vehicle includes a vehicle. A power supply is positioned in the vehicle. Each of a plurality of heating elements extends through a portion of an exterior surface of the vehicle. Each of the heating elements is electrically coupled to the power supply. The power supply supplies power to the heating elements to heat the heating elements to melt ice and snow from the exterior surface of the vehicle.

17 Claims, 2 Drawing Sheets

SNOW MELTING SYSTEM

BACKGROUND OF THE INVENTION

1. Field of the Invention

The present invention relates to vehicle heating systems and more particularly pertains to a new vehicle heating system for heating a vehicle to melt snow and ice from an exterior of the vehicle.

2. Description of the Prior Art

The use of vehicle heating systems is known in the prior art. While these devices fulfill their respective, particular objectives and requirements, the need remains for a system that has certain improved features that warm the exterior surface of a vehicle to melt snow and ice from the vehicle. Additionally, the system should recharge itself through solar power to avoid draining the vehicle's power supply.

SUMMARY OF THE INVENTION

The present invention meets the needs presented above by generally comprising a vehicle. A power supply is positioned in the vehicle. Each of a plurality of heating elements extends through a portion of an exterior surface of the vehicle. Each of the heating elements is electrically coupled to the power supply. The power supply supplies power to the heating elements to heat the heating elements to melt ice and snow from the exterior surface of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
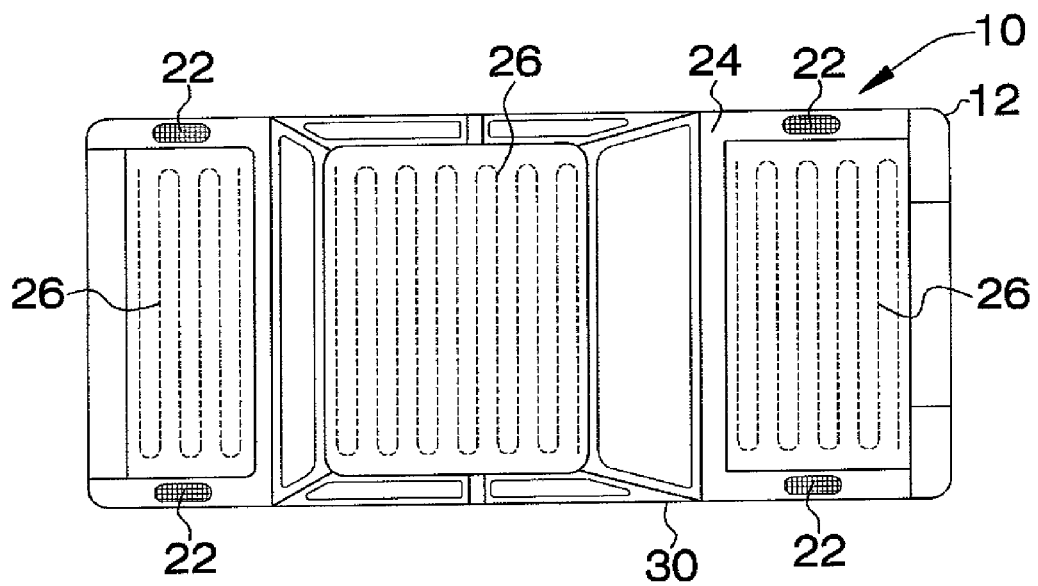
FIG. 1 is a top view of a snow melting system according to the present invention.
Figure 2:
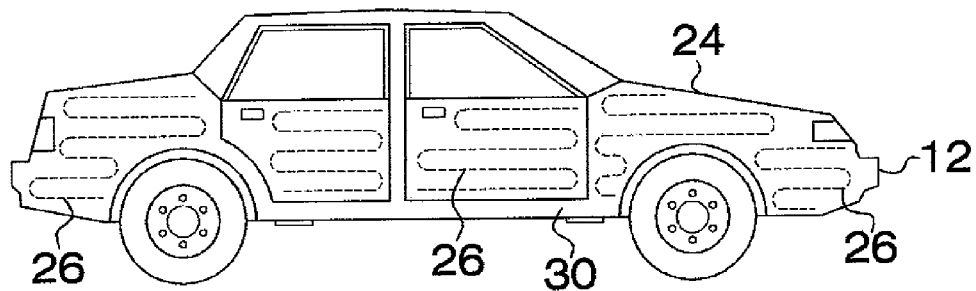
FIG. 2 is a side view of the present invention.
Figure 3:
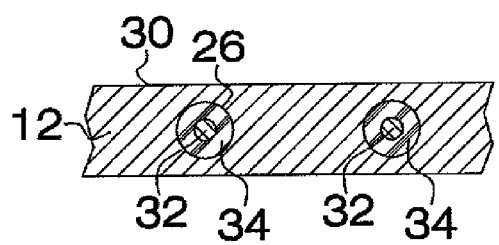
FIG. 3 is a cross-sectional view of a portion of the exterior surface and one of the heating elements of the present invention.
Figure 4:
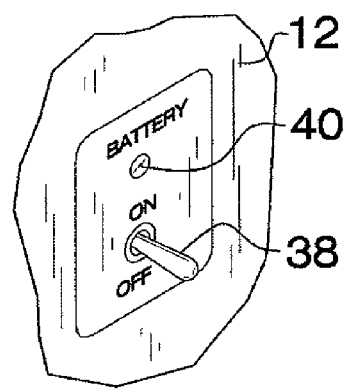
FIG. 4 is an enlarged perspective view of an activation switch and light emitter of the present invention.
Figure 5:
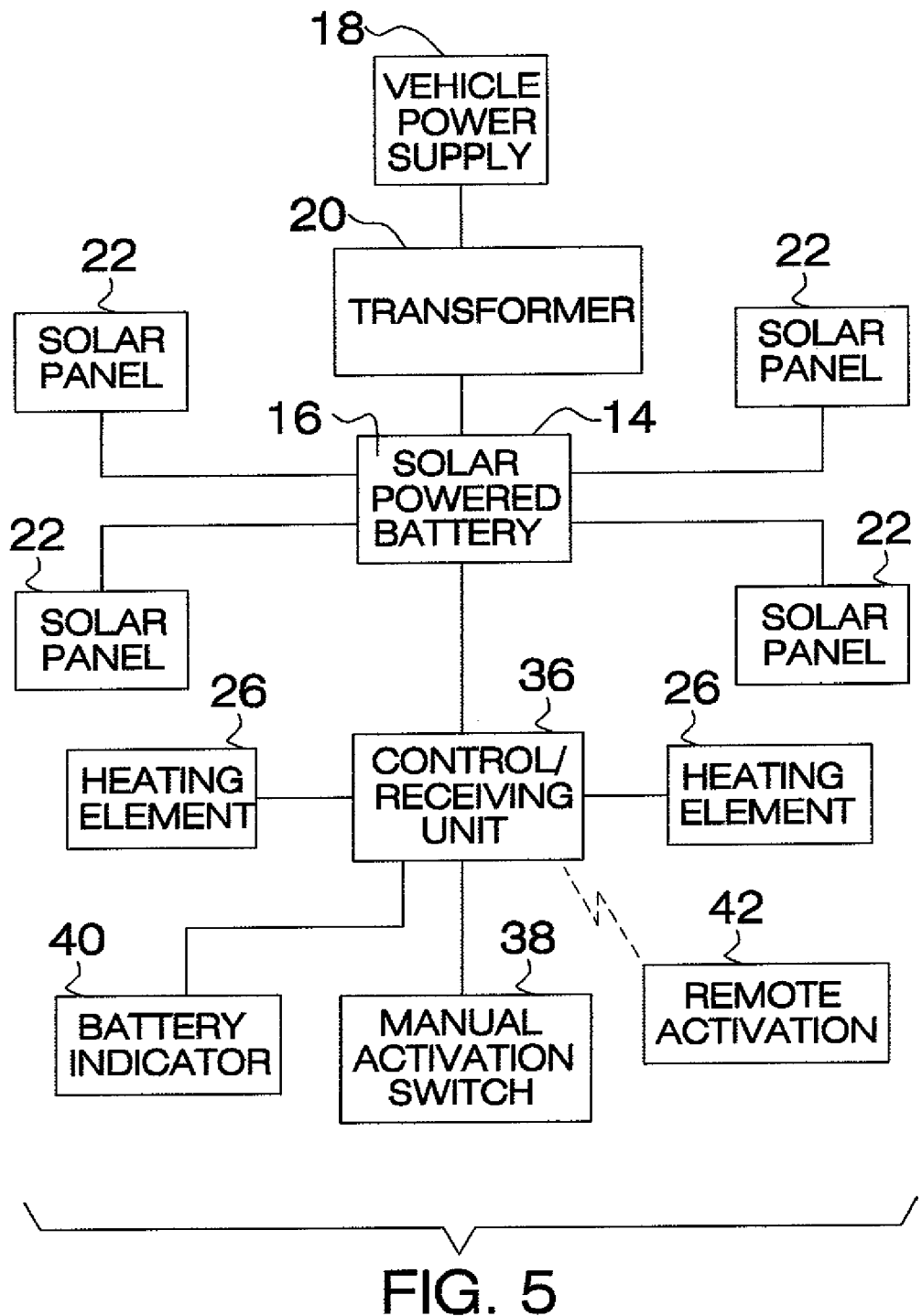
FIG. 5 is a schematic view of the present invention.

With reference now to the drawings, and in particular to FIGS. 1 through 5 thereof, a new vehicle heating system embodying the principles and concepts of the present invention and generally designated by the reference numeral 10 will be described.

As best illustrated in FIGS. 1 through 5, the snow melting system 10 generally comprises a vehicle 12. A power supply 14 is positioned in the vehicle 12. The power supply 14 includes at least one heater power source 16 positioned in the vehicle 12. A vehicle power source 18 is positioned in the vehicle 12. The vehicle power source 18 supplies power to the vehicle 12. The vehicle power source 18 is electrically connected to the at least one heater power source 16 to supplement power to the at least one heater power source 16 when power is being drained from the at least one heater power source 16.

The power supply 14 also includes a transformer 20 electrically connected between the vehicle power source 18 and the at least one heater power source 16. The transformer 20 regulates power transfer from the vehicle power source 18 to the at least one heater power source 16. At least one solar panel 22 is coupled to an upper face 24 of the vehicle 12. The at least one solar panel 22 is electrically coupled to the at least one heater power source 16. The at least one solar panel 22 converts light energy into electrical energy to recharge the at least one heater power source 16 when the at least one solar panel 22 is exposed to light.

Each of a plurality of heating elements 26 extends through a portion of an exterior surface 30 of the vehicle 12. Each of the heating elements 26 is electrically coupled to the power supply 14. The power supply 14 supplies power to the heating elements 26 to heat the heating elements 26 to melt ice and snow from the exterior surface 30 of the vehicle 12. Each of the heating elements 26 includes a core 32. The core 32 is electrically conductive and is in electrical communication with the power supply 14. The core 32 is resistive to electricity passing through the core 32 to generate heat. Each of the heating elements 26 includes an electrical insulator 34 positioned around the core 32 to inhibit electrical communication between the core 32 and the exterior surface 30 of the vehicle 12.

A control unit 36 is in electrical communication between the heating elements 26 and the power supply 14. The control unit 36 controls flow of power from the power supply 14 to the heating elements 26. An activation switch 38 is coupled to the vehicle 12 and is accessible by a driver of the vehicle 12. The activation switch 38 is in electrical communication with the control unit 36. The activation switch 38 is actuated to control the flow of power from the power supply 14 to the heating elements 26.

A light emitter 40 is in electrical communication with the control unit 36. The light emitter 40 emits light when the control unit 36 detects power from the power supply 14 drops below a predetermined level. A remote unit 42 transmits a wireless signal to the control unit 36 from a remote location. The remote unit 42 is actuated to transmit the wireless signal to the control unit 36 to supply power to the heating elements 26.

In use, the activation switch 38 is actuated by the driver of the vehicle 12 to supply power to the heating elements 26 to melt snow and ice from the vehicle 12. The light emitter 40 will emit light to alert the drive with the power supply 14 is reaching a predetermined level and the flow of power to the heating elements 26 be halted to allow the power supply 14 to recharge. Additionally, the remote unit 42 may be actuated to allow power to be supplied to the heating elements 26 to melt the ice and snow when the driver is out of the vehicle 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snow melting system comprising:
a vehicle;
a power supply being positioned in said vehicle;
a plurality of heating elements, each of said heating elements extending through a portion of an exterior surface of said vehicle, each of said heating elements being electrically coupled to said power supply, said power supply supplying power to said heating elements to heat said heating elements to melt ice and snow from said exterior surface of said vehicle;
said power supply including at least one heater power source being positioned in said vehicle, said heating elements being electrically coupled to said heater power source;
said power supply including a vehicle power source being positioned in said vehicle, said vehicle power source supplying power to said vehicle, said vehicle power source being electrically connected to said at least one heater power source to supplement power to said at least one heater power source when power is being drained from said at least one heater power source; and
said power supply including a transformer being electrically connected between said vehicle power source and said at least one heater power source, said transformer regulating power transfer from said vehicle power source to said at least one heater power source.

2. The system according to claim 1, wherein said power supply includes at least one solar panel being coupled to an upper face of said vehicle, said at least one solar panel being electrically coupled to said at least one heater power source, said at least one solar panel converting light energy into electrical energy to recharge said at least one heater power source when said at least one solar panel is exposed to light.

3. The system according to claim 1, wherein each of said heating elements includes a core, said core being electrically conductive and being in electrical communication with said power supply, said core being resistive to electricity passing through said core to generate heat.

4. The system according to claim 3, wherein each of said heating elements includes an electrical insulator being positioned around said core to inhibit electrical communication between said core and said exterior surface of said vehicle.

5. The system according to claim 1, further comprising a control unit being in electrical communication between said heating elements and said power supply, said control unit controlling flow of power from said power supply to said heating elements.

6. The system according to claim 5, further comprising an activation switch being coupled to said vehicle and being accessible by a driver of the vehicle, said activation switch being in electrical communication with said control unit, said activation switch being actuated to control the flow of power from said power supply to said heating elements.

7. The system according to claim 5, further comprising a light emitter being in electrical communication with said control unit, said light emitter emitting light when said control unit detects power from said power supply drops below a predetermined level.

8. The system according to claim 5, further comprising a remote unit transmitting a wireless signal to said control unit from a remote location, said remote unit being actuated to transmit the wireless signal to said control unit to supply power to said heating elements.

9. A snow melting system comprising:
a vehicle;
a power supply being positioned in said vehicle, said power supply comprising:
at least one heater power source being positioned in said vehicle;
a vehicle power source being positioned in said vehicle, said vehicle power source supplying power to said vehicle, said vehicle power source being electrically connected to said at least one heater power source to supplement power to said at least one heater power source when power is being drained from said at least one heater power source;
a transformer being electrically connected between said vehicle power source and said at least one heater power source, said transformer regulating power transfer from said vehicle power source to said at least one heater power source;
at least one solar panel being coupled to an upper face of said vehicle, said at least one solar panel being electrically coupled to said at least one heater power source, said at least one solar panel converting light energy into electrical energy to recharge said at least one heater power source when said at least one solar panel is exposed to light;
a plurality of heating elements, each of said heating elements extending through a portion of an exterior surface of said vehicle, each of said heating elements being electrically coupled to said power supply, said power supply supplying power to said heating elements to heat said heating elements to melt ice and snow from said exterior surface of said vehicle, each of said heating elements including a core, said core being electrically conductive and being in electrical communication with said power supply, said core being resistive to electricity passing through said core to generate heat, each of said heating elements including an electrical insulator being positioned around said core to inhibit electrical communication between said core and said exterior surface of said vehicle;
a control unit being in electrical communication between said heating elements and said power supply, said control unit controlling flow of power from said power supply to said heating elements;
an activation switch being coupled to said vehicle and being accessible by a driver of the vehicle, said activation switch being in electrical communication with said control unit, said activation switch being actuated to control the flow of power from said power supply to said heating elements;
a light emitter being in electrical communication with said control unit, said light emitter emitting light when said control unit detects power from said power supply drops below a predetermined level; and
a remote unit transmitting a wireless signal to said control unit from a remote location, said remote unit being actuated to transmit the wireless signal to said control unit to supply power to said heating elements.

10. A snow melting system comprising:

a vehicle;

a power supply being positioned in said vehicle;

a plurality of heating elements, each of said heating elements extending through a portion of an exterior surface of said vehicle, each of said heating elements being electrically coupled to said power supply, said power supply supplying power to said heating elements to heat said heating elements to melt ice and snow from said exterior surface of said vehicle;

a control unit being in electrical communication between said heating elements and said power supply, said control unit controlling flow of power from said power supply to said heating elements; and a remote unit transmitting a wireless signal to said control unit from a remote location, said remote unit being actuated to transmit the wireless signal to said control unit to supply power to said heating elements; and a light emitter being in electrical communication with said control unit, said light emitter emitting light when said control unit detects power from said power supply drops below a predetermined level.

11. The system according to claim 10, wherein said power supply includes at least one heater power source being positioned in said vehicle, said heating elements being electrically coupled to said heater power source.

12. The system according to claim 11, wherein said power supply includes a vehicle power source being positioned in said vehicle, said vehicle power source supplying power to said vehicle, said vehicle power source being electrically connected to said at least one heater power source to supplement power to said at least one heater power source when power is being drained from said at least one heater power source.

13. The system according to claim 12, wherein said power supply includes a transformer being electrically connected between said vehicle power source and said at least one heater power source, said transformer regulating power transfer from said vehicle power source to said at least one heater power source.

14. The system according to claim 11, wherein said power supply includes at least one solar panel being coupled to an upper face of said vehicle, said at least one solar panel being electrically coupled to said at least one heater power source, said at least one solar panel converting light energy into electrical energy to recharge said at least one heater power source when said at least one solar panel is exposed to light.

15. The system according to claim 10, wherein each of said heating elements includes a core, said core being electrically conductive and being in electrical communication with said power supply, said core being resistive to electricity passing through said core to generate heat.

16. The system according to claim 15, wherein each of said heating elements includes an electrical insulator being positioned around said core to inhibit electrical communication between said core and said exterior surface of said vehicle.

17. The system according to claim 10, further comprising an activation switch being coupled to said vehicle and being accessible by a driver of the vehicle, said activation switch being in electrical communication with said control unit, said activation switch being actuated to control the flow of power from said power supply to said heating elements.

* * * * *